United States Patent Office 3,097,184
Patented July 9, 1963

3,097,184
MODIFIED, PHOSPHORUS - CONTAINING POLYESTER RESINS AND PROCESS FOR PREPARING SAME
Claus Heuck, Hofheim, Taunus, Fritz Rochlitz and Heinz Schmidt, Frankfurt am Main, and Herbert Vilcsek and Jakob Winter, Hofheim, Taunus, Germany, assignors to Farbwerke Hoechst Aktiengesellschaft vormals Meister Lucius & Brüning, Frankfurt am Main, Germany, a corporation of Germany
No Drawing. Filed May 26, 1959, Ser. No. 815,823
Claims priority, application Germany May 31, 1958
12 Claims. (Cl. 260—45.4)

In our copending application Ser. No. 815,828 filed concurrently herewith we have described a process for the manufacture of phosphorus-containing polycondensation products by reacting mono- and polyhydric alcohols with mono- and poly-basic carboxylic acids and dihalides of phosphorous acid monoesters and phosphoric acid monoesters.

As taught in said copending application, the polyesters are formed by reacting the dihalides with an acidic component containing up to 20 mol percent of monocarboxylic acids, the balance being polycarboxylic acids, and an alcohol component containing up to 30 mol percent of monohydric alcohols, the balance being polyhydric alcohols. In place of the acids, equivalent acid chlorides, acid anhydrides, and/or esters can be used.

The phosphorus-containing polyester may be formed by reacting the dihalides with the mixed acid and alcohol components, or by first reacting these components to form a hydroxylic polyester which is then reacted with the dihalide, or by reatcing the dihalide with the alcohol component to form an intermediate which is then reacted with the acid component.

Now we have found that the aforesaid phosphorus-containing polycondensation products can be transformed into hardened artificial resins in case they contain at least 5 mol percent of $\alpha,\beta$-unsaturated carboxylic acids and/or alcohols of the allyl type incorporated by condensation. For this purpose the phosphorus-containing polycondensation products are polymerized in admixture with other, mostly low molecular weight compounds containing activated double bonds, in which they are soluble. The polymerization is carried out in a manner known for unsaturated polyesters in the presence of catalysts so as to yield shaped bodies. The hardened resins are largely insoluble and more or less difficult to ignite or they extinguish automatically after the removal of a source of ignition. The hardened resins possess the self-extinguishing property even in case they contain only 1–1.5% by weight of phosphorus, calculated on the hardened resin.

As suitable compounds of low molecular weight which may be subjected to a copolymerization together with the aforesaid phosphorus-containing polyesters there are mentioned by way of example: styrene, styrenes that are alkylated in the nucleus and/or the side chain, for example by the methyl or ethyl group, vinyl naphthalene, vinyl esters such as vinyl acetate or vinyl propionate, acrylic acid and methacrylic acid and the esters thereof with monohydric aliphatic alcohols having 1–6 carbon atoms in a straight or branched chain and preferably having 1–3 carbon atoms, the nitriles of acrylic acid and methacrylic acid, allyl esters and methallyl esters of saturated or unsaturated mono- and polycarboxylic acids, for example acetic acid allyl ester, succinic acid diallyl ester, phthalic acid and terephthalic acid diallyl esters, maleic acid diallyl ester etc., allyl and methallyl carbonates, allyl and methallyl phosphates and phosphonates, esters of vinylphosphonic acid, for example the corresponding methyl and ethyl esters, triallyl cyanurate, triallyl trimesinate, unsaturated polyesters of low molecular weight prepared for example by the process described in French Patent 1,170,749 from terephthalic acid dialkyl esters, alkylene glycols and unsaturated dicarboxylic acids, if desired in the presence of saturated acids, or by the process described in U.S. patent application Serial No. 685,812, filed September 24, 1957, by J. Winter et al. (meanwhile abandoned) from a mixture of monohydric alcohols with at least trihydric alcohols and $\alpha,\beta$-unsaturated dicarboxylic acids, if desired in the presence of saturated polycarboxylic acids, particularly polyesters containing allyl or methallyl ester groups, and the derivatives thereof substituted by halogen atoms, preferably chlorine atoms, such as those on the basis of tetrachlorophthalic acid and hexachloro-endomethylene-tetrahydrophthalic acid.

The copolymerization is brought about by irradiation and/or heating and/or adding activators such as peroxides, for example benzoyl peroxide, di-tert.-butyl peroxide, chlorobenzoyl peroxide, lauroyl peroxide, oleic acid peroxide, methylethylketone peroxide, tert. butyl hydroperoxide, cumene hydroperoxide. It is particularly suitable, however, to use hydroperoxides. Furthermore there may be employed azodiisobutyronitrile, sulfinic acids, such as p-methoxy-sulfinic acid, dodecyl-sulfinic acid, cyclohexyl-sulfinic acid, benzene-sulfinic acid, p-toluene-sulfinic acid etc., sulfon-amines such as N-bis-(p-tolylsulfonmethyl)-methylamine, N-bis-(p-tolylsulfonmethyl)-2-hydroxyethylamine etc. and sulfon-carbinols, for example p-tolylsulfon-carbinol, phenyl sulfon-carbinol or p-chloro-phenyl-carbinol.

Furthermore there may be additionally used organic metal compounds as accelerators, such as cobalt octoate.

The products obtained by copolymerization are distinguished by a high transparency and are suitable for many applications, for example as shaped bodies. Furthermore they can be used for impregnating paper and textile materials or for the protection of surfaces in which case it is necessary, of course, to apply the starting mixture prior to the hardening to the materials to be impregnated or the surfaces to be protetced and then to bring about polymerization.

The masses produced by the process of the invention may likewise be admixed with various additives, for example highly chlorinated hydrocarbons or filling agents of organic or inorganic nature and they can be reinforced by embedding organic or inorganic fibers such as glass fibers.

It has already been proposed to produce hardened phosphorus-containing artificial resins by copolymerizing unsaturated phosphorus-containing polycondensation products with compounds of low molecular weight containing activated double bonds. As compared with the products obtained by a known process the masses produced by the process of the invention are characterized by improved mechanical and electrical properties, by a reduced water absorption and by a more economical production.

The following examples serve to illustrate the invention, but they are not intended to limit it thereto, the parts being by weight unless otherwise stated.

*Example 1*

81 parts of phosphoric acid hexyl ester dichloride are reacted at 70° C. with 400 parts of a polyester produced from 148 parts of phthalic anhydride, 162 parts of ethylene glycol and 123 parts of maleic anhydride. The mixture is heated for a further hour to 100° C. and then for 1 hour to 120° C. Subsequently the pressure is reduced to a vacuum of 40–60 mm. of mercury, the temperature is raised to 140° C. and finally to 180° C. A viscous, slightly yellowish and transparent resin is obtained which does no longer flow and possesses good dissolving properties in organic solvents.

70 parts of the phosphorus-containing polycondensation product thus obtained are mixed at 80° C. with 30 parts of styrene. A limpid, entirely colorless solution is obtained which can be hardened at 80° C. in the presence of 0.5% by weight of benzoyl peroxide to yield colorless and transparent shaped bodies. The product obtained is characterized by a great hardness and a great bending strength, and is difficult to ignite.

*Example 2*

175 parts of phosphorous acid butyl ester dichloride are added dropwise while stirring at 60° C. and within 45 minutes to 372 parts of ethylene glycol. The whole is then boiled for 4 hours under reflux at atmospheric pressure and then heated for 1 hour under a reduced pressure of 40–60 mm. of mercury. After having cooled, 222 parts of phthalic anhydride and 343 parts of maleic anhydride are introduced into the reaction flask and esterification is brought about in the presence of xylene as water entrainer until the calculated amount of water has distilled off. The xylene, the unreacted constituents and the residual amounts of water are then removed under a reduced pressure of 40–70 mm. of mercury and at a temperature of 180–190° C.

70 parts of the resin thus obtained are mixed at 90° C. with 30 parts of styrene, 2% of benzoyl peroxide are added and the whole is heated to 100° C. Gelation sets in after 20 minutes and after 30 minutes the product has hardened. When the product obtained is subjected to an after-hardening for 1½ hours at 100° C., it possesses the following properties:

| | | |
|---|---|---|
| Bending strength | kg./cm.$^2$ | 1300 |
| Impact strength | cm. kg./cm.$^2$ | 9.6 |
| Tensile strength | kg./cm.$^2$ | 660 |
| Ball pressure hardness | kg./cm.$^2$ | 1515 |
| Martens number | degrees | 52 |
| Extinguishing period | secs | 1 |

It is likewise possible to harden the resin/styrene combination at room temperaturre. With 2% of methyl-ethyl-ketone peroxide and 0.5% of octadecyl isocyanate gelation takes place after 22 minutes at 22° C. and the product has hardened after 70 hours. When the product is after-hardened for 1½ hours at 100° C., it has the following values:

| | | |
|---|---|---|
| Tensile strength | kg./cm.$^2$ | 600 |
| Ball pressure hardness | kg./cm.$^2$ | 1370 |
| Martens number | degrees | 50 |
| Bending strength | kg./cm.$^2$ | 1150 |
| Impact strength | cm. kg./cm.$^2$ | 14.2 |
| Extinguishing period | secs | 1.5 |

The extinguishing period is determined as follows: The hardened casting (thickness 4 mm.) is held for 10 sec. in a nonluminous Bunsen flame and after the removal of the source of ignition the time is determined in seconds until the burning casting extinguishes (extinguishing period). The extinguishing periods given are average values from 2–3 measurements.

*Example 3*

A polycondensation product is prepared as described in the first part of Example 2 from 372 parts of ethylene glycol, 191 parts of phosphorus acid butyl ester dichloride, 222 parts of phthalic anhydride and 343 parts of maleic anhydride.

Said resin is mixed at 80° C. with styrene in a ratio of 70:30 and hardened with 2% of dibenzyl peroxide at 100° C. When the product is after-hardened for 1½ hours at 100° C., a resin is obtained having the following properties:

| | | |
|---|---|---|
| Tensile strength | kg./cm.$^2$ | 470 |
| Ball pressure hardness | kg./cm.$^2$ | 1305 |
| Martens number | degrees | 50 |
| Bending strength | kg./cm.$^2$ | 1065 |
| Impact strength | cm. kg./cm.$^2$ | 8.2 |
| Extinguishing period | secs | 2 |

(as defined in Example 2).

When the polycondensation product is hardened in the cold with 1% of octadecyl isocyanate and 2% of methyl-ethyl-ketone peroxide, a resin is obtained having approximately the same ball pressure hardness and bending strength and a tensile strength of 685 cm. kg./cm.$^2$, an impact strength of 12.4 kg./cm.$^2$ and an extinguishing period of 1.5 secs.

We claim:
1. A method of making self-extinguishing phosphorus-containing artificial resins which comprises copolymerizing, in the presence of a catalyst promoting polymerization, (A) at least one low molecular weight compound containing activated double bonds in an unsaturated group selected from the group consisting of vinyl, allyl, and methallyl groups, and (B) at least one unsaturated polyester containing phosphorus incorporated into the molecule by ester linkages, said polyester being obtained by reacting (i) at least one member selected from the group consisting of dihalides of phosphoric acid monoesters and dihalides of phosphorous acid monoesters with (ii) a carboxylic acid component consisting of up to 20 mol percent of monocarboxylic acids, the balance being polycarboxylic acids, and (iii) an alcohol component consisting of up to 30 mol percent of monohydric alcohols, the balance being polyhydric alcohols, whereby a polyester containing phosphorus incorporated into the molecule by ester linkages is formed, said carboxylic acid component and alcohol component being such that the resulting polyester contains at least 5 mol percent of a member selected from the group consisting of $\alpha,\beta$-unsaturated carboxylic acids and alcohols having an allylic unsaturation condensed thereinto.

2. A method as in claim 1 wherein said low molecular weight compound is a vinyl monomer.

3. A method as in claim 1 wherein said low molecular weight compound is styrene.

4. A method as in claim 1 wherein said unsaturated phosphorus-containing polyester is formed by first condensing said carboxylic acid component and said alcohol component to form an intermediate polyester polymer having free hydroxy groups, and then reacting said intermediate polymer with said dihalide.

5. A method as in claim 4 wherein said low molecular weight compound is a vinyl monomer.

6. A method as in claim 4 wherein said low molecular weight compound is styrene.

7. A method as in claim 1 wherein said unsaturated phosphorus-containing polyester is formed by first reacting said dihalide and said alcohol component to form an intermediate compound which is then reacted with said acid component.

8. A method as in claim 7 wherein said low molecular weight compound is a vinyl monomer.

9. A method as in claim 7 wherein said low molecular weight compound is styrene.

10. Products obtained according to claim 1.
11. Products obtained according to claim 2.
12. Products obtained according to claim 3.

References Cited in the file of this patent

UNITED STATES PATENTS

| | | |
|---|---|---|
| 2,516,309 | Fraser | July 25, 1950 |
| 2,636,876 | Zenftman et al. | Apr. 28, 1953 |
| 2,716,101 | Coover et al. | Aug. 23, 1955 |
| 2,824,085 | Cummings | Feb. 18, 1958 |
| 2,877,204 | Duhnkrack et al. | Mar. 10, 1959 |
| 2,918,449 | Fan Toy et al. | Dec. 22, 1959 |